United States Patent [19]
Perrott et al.

[11] Patent Number: 5,149,183
[45] Date of Patent: Sep. 22, 1992

[54] COLOR ENHANCING LENS

[75] Inventors: Colin M. Perrott, Portola Valley, Calif.; Kenneth J. Pidgeon, O'Halloran Hill, Australia

[73] Assignee: Pilkington Visioncare Holdings, Inc., Menlo Park, Calif.

[21] Appl. No.: 588,181

[22] Filed: Sep. 26, 1990

[30] Foreign Application Priority Data

Sep. 29, 1989 [GB] United Kingdom ............... 8921993

[51] Int. Cl.$^5$ .................................................. G02B 5/20
[52] U.S. Cl. .................................. 359/885; 359/350; 359/722; 351/163
[58] Field of Search ............... 359/885, 887, 888, 350, 359/355, 652, 722, 723, 84; 351/163, 165; 252/586

[56] References Cited

U.S. PATENT DOCUMENTS

| | | | |
|---|---|---|---|
| 4,650,605 | 3/1987 | Vance | 350/311 |
| 4,783,142 | 11/1988 | Mutzhas | 350/311 |
| 4,793,668 | 12/1988 | Longstaff | 350/1.1 |
| 4,798,427 | 1/1989 | Sear | 350/1.1 |

Primary Examiner—Loha Ben
Attorney, Agent, or Firm—Burns, Doane, Swecker & Mathis

[57] ABSTRACT

A color enhancing sun lens comprising a lens having an integrated visible light transmission, with respect to CIE illuminant C, of less than 40% T, wherein the transmission over a 10 nm wide band centered on 480 nm and a second 10 nm wide band centered on 630 nm is at least 1.5 times the integrated visible light transmission of the lens.

7 Claims, 5 Drawing Sheets 5,149,183

COLOR ENHANCING LENS

BACKGROUND OF THE INVENTION

1. Field of the Invention

This invention relates to Colour Enhancing lenses, particularly to such lenses having an integrated visible light transmission, with respect to CIE (Commission Internationale De L'Eclairage) illuminant C, of less than 40% T, referred to hereafter as sun lenses.

2. Description of the Prior Art

In addition to attenuating the overall level of light reaching the eye, sun lenses for use in sunglasses often distort the spectral composition of the transmitted light to provide various effects. Recently much attention has been paid to sun lenses that block or markedly attenuate ultra violet light up to a wavelength of 380 nm. Research has also indicated that light components of even longer wavelengths may also be beneficially attenuated. Accordingly, sun lenses are now available which have a pronounced amber coloration and block blue light in addition to ultra violet light. Such sun lenses have a transmission curve which allows a gradual increase in transmittance as the wavelength increases above 450 nm. This means that blues and greens are severely attenuated compared with yellows and reds.

It is now believed that it is only blue light with a wavelength of less than 450 nm that causes harm to the eye and the present invention seeks to provide a lens which selectively attenuates blue and red light to a lesser extent than prior art lenses, thereby providing a color enhancing lens.

SUMMARY OF THE INVENTION

In accordance with the present invention a Color Enhancing sun lens comprises a lens having an integrated visible light transmission, with respect to CIE illuminant C, of less than 40% T wherein the transmission over a 10 nm wide band centered on 480 nm and a second 10 nm wide band centered on 630 nm is at least 1.5 times the integrated visible light transmission of the lens.

Desirably the Color Enhancing lens transmits substantially no, i.e. less than 1%, of, light with a wavelength of 450 nm or less, or transmits such light at a level of 5% or less. This provides the necessary blocking of harmful u.v. radiation.

Preferably the lens has peaks of absorption corresponding to the colors green and yellow. Green is the opponent color of red and yellow is the opponent color of blue. By suppressing green and yellow, blue and red are perceived to be enhanced by a human observer.

The shape of the transmission curve of the lens may be controlled by use of appropriate narrow band absorbing materials to obtain lenses of cosmetically attractive colors such as brown, grey and green. The shape should also provide a lens which has sufficient transmission to enable traffic light recognition to occur.

BRIEF DESCRIPTION OF THE DRAWINGS

The invention will now be described, by way of example only and with reference to the accompanying drawings of which.

DESCRIPTION OF THE PREFERRED EMBODIMENTS

Figure 1:
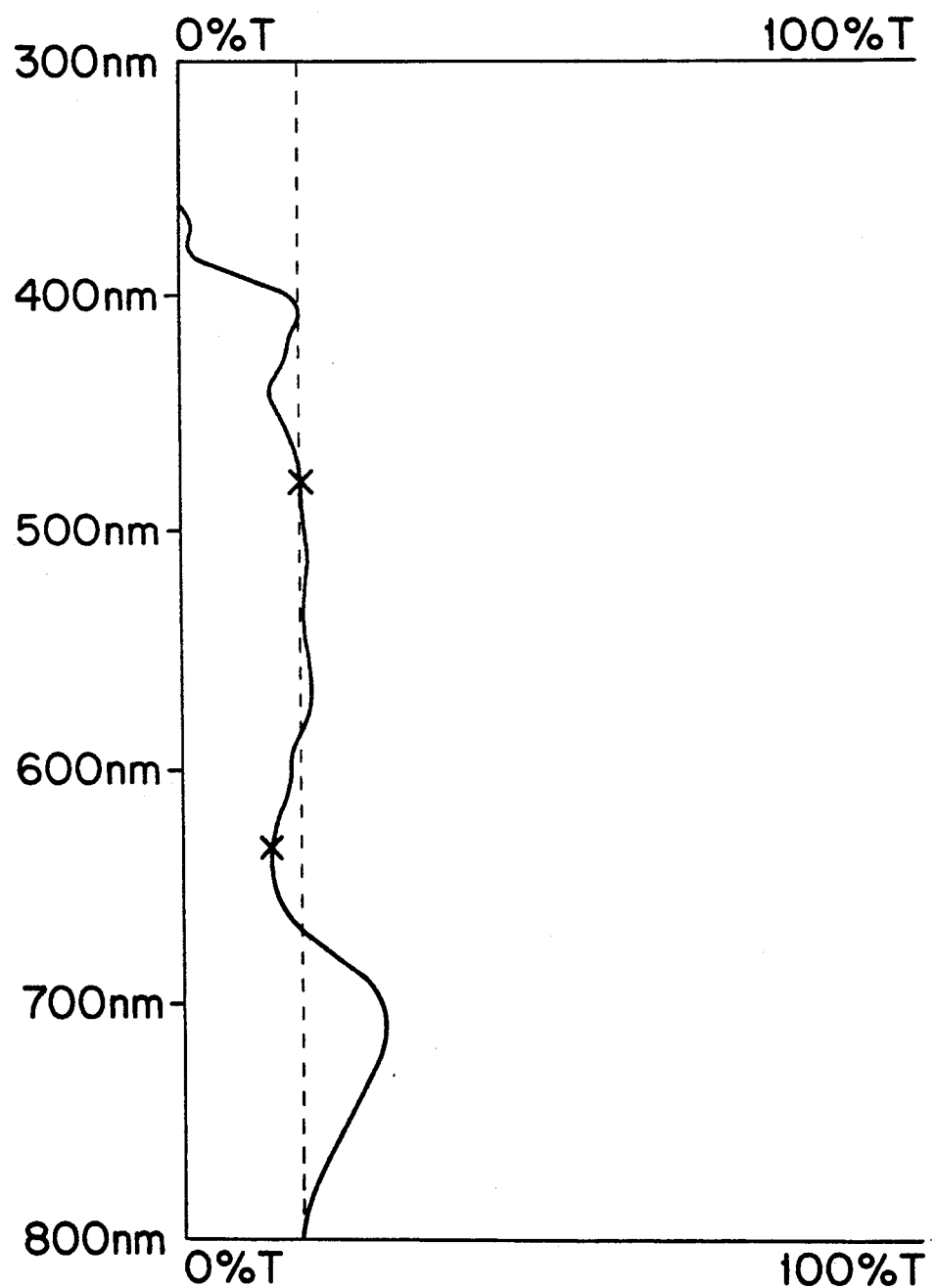
FIG. 1 is the transmission curve of a known Green lens.

FIG. 1 shows a conventional sun lens which has an integrated visible transmission, with respect to CIE illuminant C of 16.61%. This value is indicated by a broken line of FIG. 1 so that areas having higher than average and lower than average transmission can be identified readily. It can be seen that the transmission level around 480 nm is about average and the transmission level around 630 nm is below average. Furthermore, this lens permits almost average amounts of light to be transmitted between 400 and 450 nm; the blue light that is now thought to be harmful to the eye. This lens has an overall green appearance.

Figure 2:
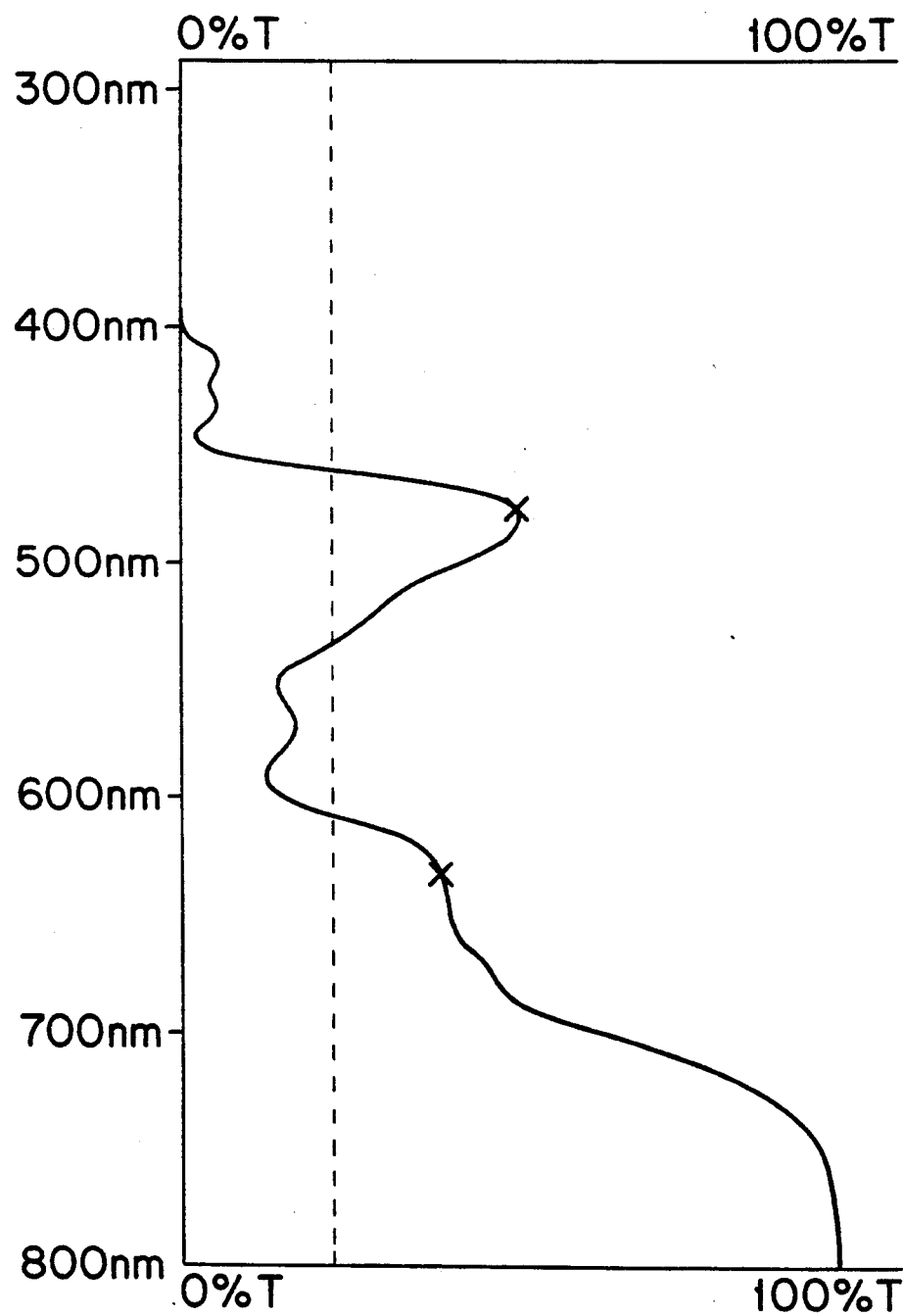
FIG. 2 is the transmission curve of a color enhancing Green lens.

In contrast, the transmission curve shown in FIG. 2 is also for a lens having a green appearance. However, it will be clear that this lens has very different spectral characteristics. The high transmission at 480 and 630 nm gives this lens a capacity to enhance blues and reds. This enhancement of opponent primary colors provides a lens which appears to give a particularly bright and attractive image to the human observer, possibly because in normal daylight scenes the green and yellow parts of the spectrum are more intense, thus suppressing the opponent colors of blue and red. In order to stimulate the human brain to be more receptive to blue and red to provide a more colorful scene it is necessary to reduce the relative intensity of their opponent colors; yellow and green. It will also be apparent that the lens of FIG. 2 has much lower transmission values in the wavelengths below 450 nm corresponding to harmful blue light.

Figure 3:
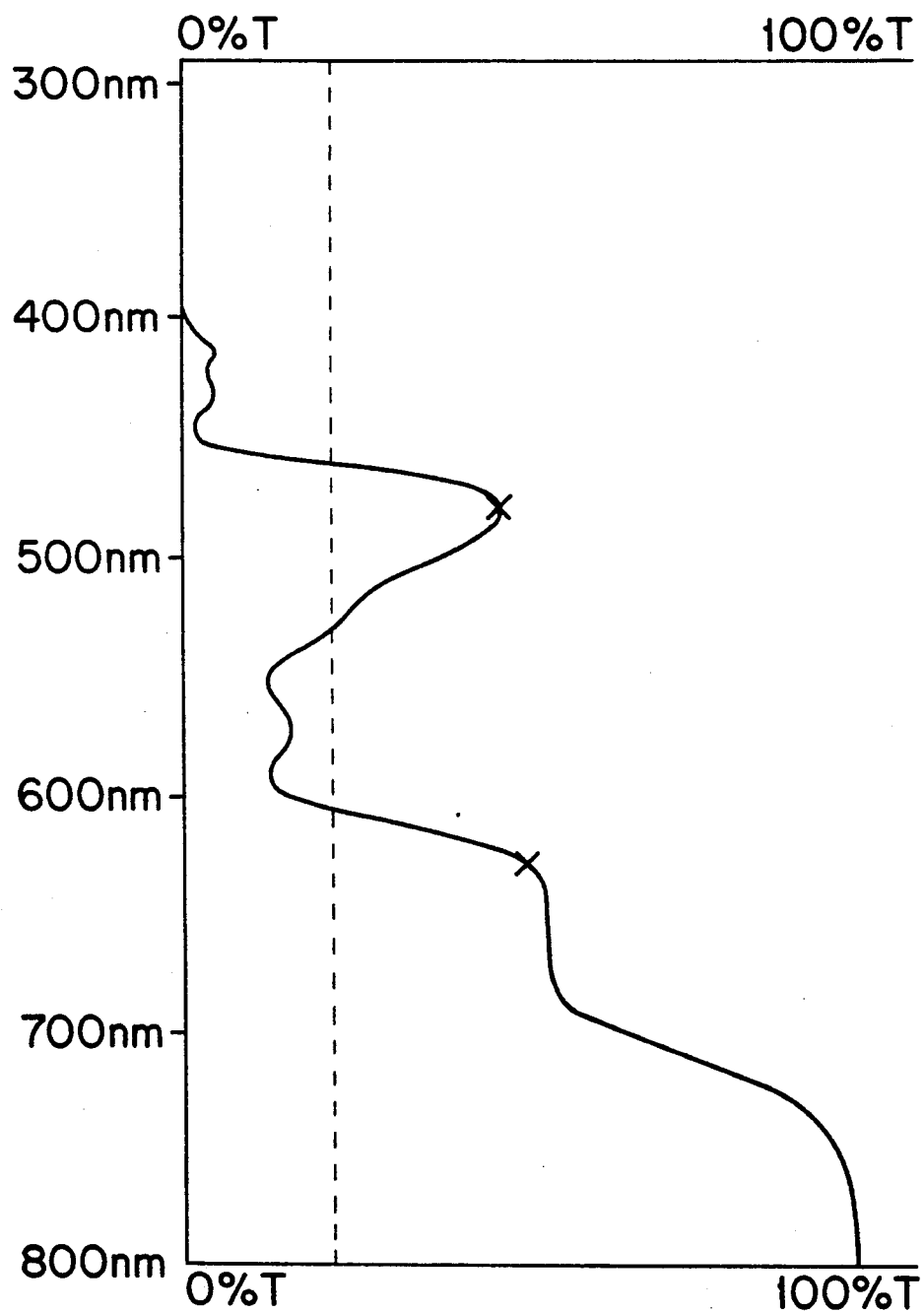
FIG. 3 is the transmission curve of a color enhancing Brown lens.
Figure 4:
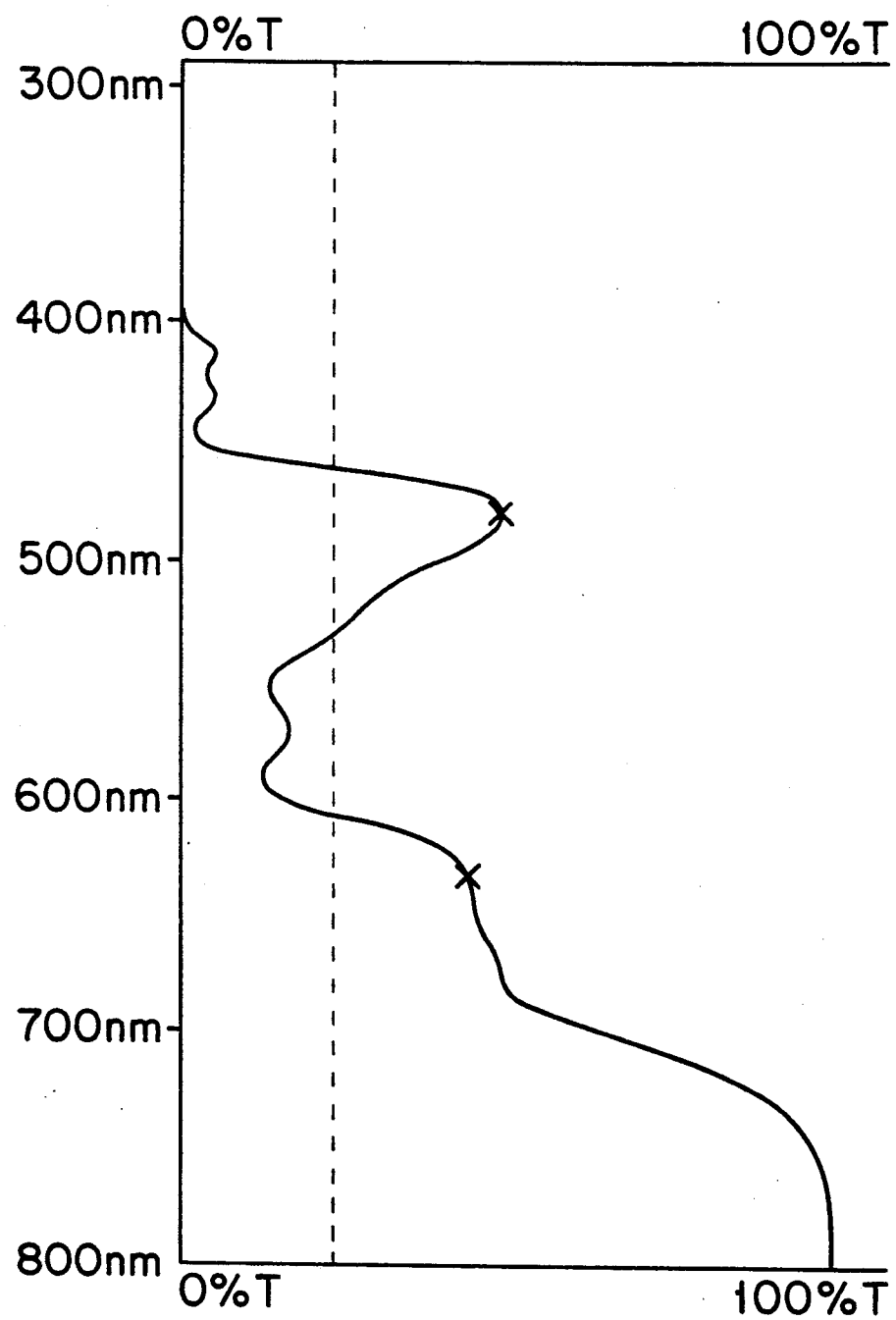
FIG. 4 is the transmission curve of a color enhancing Grey lens.

FIG. 3 shows how this principle can be applied to give a lens having a brownish appearance. As can be seen this is achieved by using absorbing material which alters the transmission characteristics between 640 and 690 nm. Likewise FIG. 4 shows how further alteration in this region can result in a lens having a grey appearance. Both of these lenses also absorb virtually all of the harmful blue light below 450 nm and both lenses give the same color enhancing effects as were obtained with the green lens of FIG. 2. The integrated visible transmission for each lens is indicated by a broken line and the transmission around 480 nm and 630 nm can be seen to be well above 1.5 times this value for each of the color enhancing lenses of FIGS. 2, 3 and 4.

For our experiments we used CR39 lenses which were body tinted by means of known dispersion dyes. However, the color enhancing concept would apply equally to glass lenses or to glass or plastic lenses with tinted coatings. Furthermore, it is possible to produce lenses which lenses have an integrated visible transmission that varies as a function of vertical position within the lens. Such lenses are well known in the sun lens art and can be made to be color enhancing in accordance with the present invention at least in the portion of the sun lens where transmission is less than 40%.

Figure 5:
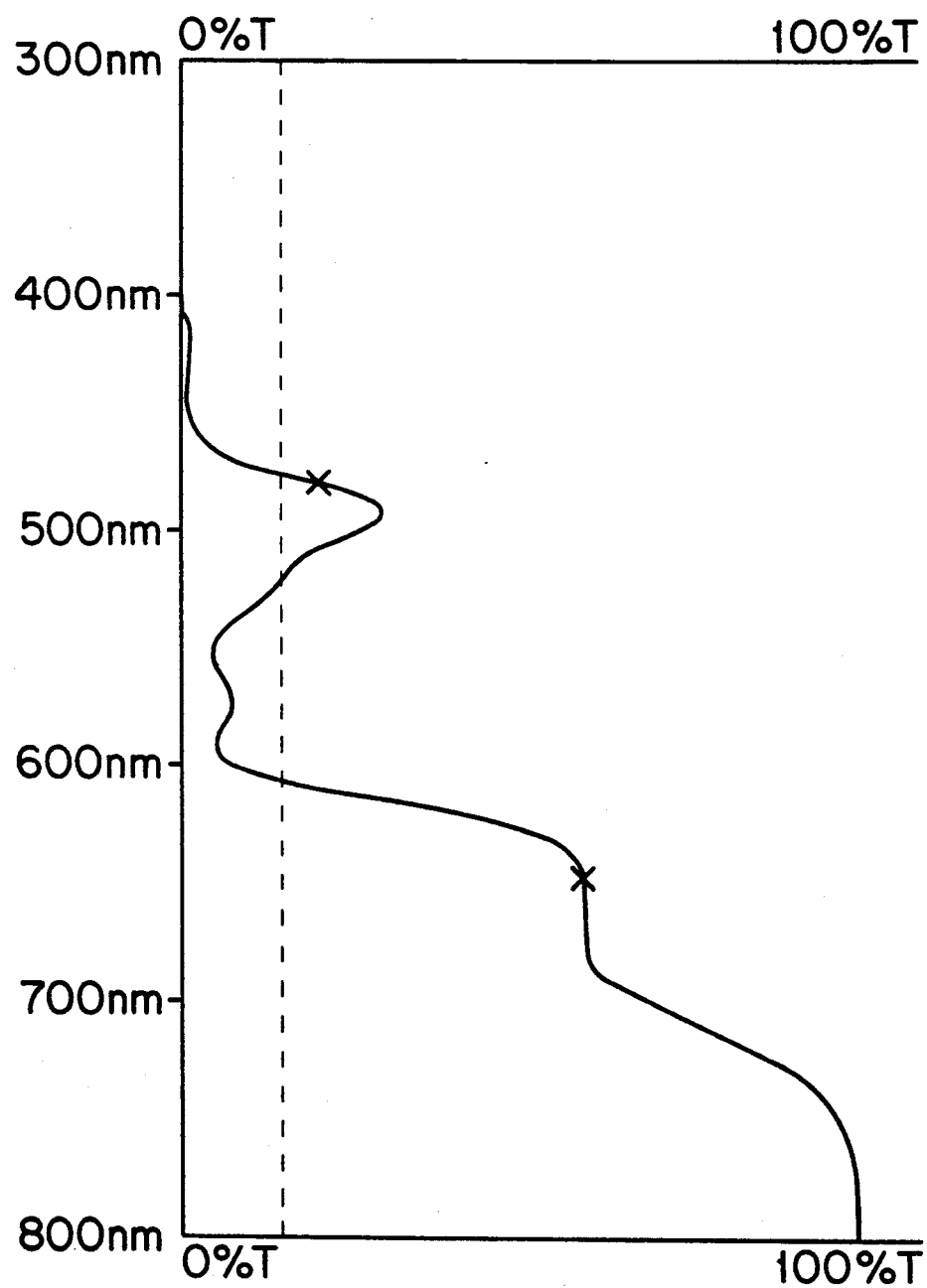
FIG. 5 is the transmission curve of a lens having too little transmission at 480 nm to give color enhancement.

To show that it is necessary to have primary color transmission which is significantly greater than the integrated visible transmission, a lens with the transmission spectrum of FIG. 5 was prepared. This lens has a peak transmission at 490 nm and its transmission at 480 nm was only 19.5% which was slightly less than 1.5 times the integrated transmission of 13.05%. Significantly this lens did not give good color enhancement because the blues did not appear significantly brighter when viewed through it.

What is claimed is:

1. A color enhancing sun lens comprising a lens having an integrated visible light transmission, with respect to CIE illuminant C, of less than 40% T, wherein the transmission over a 10 nm wide band centered on 480 nm and a second 10 nm wide band centered on 630 nm is at least 1.5 times the integrated visible light transmission of the lens.

2. A sun lens according to claim 1, in which at most 5% of light having a wavelength of 450 nm or less is transmitted.

3. A sun lens according to claim 1, in which at most 1% of light having a wavelength of 450 nm or less is transmitted.

4. A sun lens according to claim 1, having absorption peaks corresponding to the colors green and yellow.

5. A sun lens according to claim 1, wherein the transmission curve is generated by selection of appropriate color absorbing materials to obtain lenses of cosmetically attractive colors.

6. A sun lens according to claim 5, in which a cosmetically attractive color is selected from a group comprising brown, grey and green.

7. A sun lens according to claim 1, wherein the transmission curve is generated by selection of appropriate color absorbing materials to obtain lenses through which traffic light signals can be recognized.

* * * * *